United States Patent
Tran (10) Patent No.: US 12,229,004 B2
(45) Date of Patent: Feb. 18, 2025

(54) GROUPING AND ERROR CORRECTION FOR NON-VOLATILE MEMORY CELLS

(71) Applicant: Silicon Storage Technology, Inc., San Jose, CA (US)

(72) Inventor: Hieu Van Tran, San Jose, CA (US)

(73) Assignee: SILICON STORAGE TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/106,421

(22) Filed: Feb. 6, 2023

(65) Prior Publication Data

US 2024/0168844 A1 May 23, 2024

Related U.S. Application Data (60) Provisional application No. 63/427,406, filed on Nov. 22, 2022.

(51) Int. Cl.
*G06F 11/10* (2006.01)

(52) U.S. Cl.
CPC ...... *G06F 11/1044* (2013.01); *G06F 11/1072* (2013.01)

(58) Field of Classification Search
CPC .......... G06F 11/1044; G06F 11/1072
See application file for complete search history.

(56) References Cited

U.S. PATENT DOCUMENTS

| | | | |
|---|---|---|---|
| 5,029,130 A | 7/1991 | Yeh | |
| 6,747,310 B2 | 6/2004 | Fan et al. | |
| 11,170,869 B1 | 11/2021 | Helmick | |
| 2011/0075478 A1 | 3/2011 | Yoon | |
| 2011/0289286 A1* | 11/2011 | Feder | G11C 11/5628 711/E12.001 |
| 2014/0059398 A1* | 2/2014 | Cunningham | G11C 29/026 714/721 |
| 2014/0185377 A1* | 7/2014 | Kim | G11C 16/26 365/185.03 |
| 2015/0349805 A1* | 12/2015 | Tsai | H03M 13/2942 714/755 |
| 2020/0192970 A1* | 6/2020 | Ma | G06N 3/044 |

(Continued)

FOREIGN PATENT DOCUMENTS

EP  2 287 740  2/2011

OTHER PUBLICATIONS

PCT Invitation to Pay Additional Fees mailed on Jul. 12, 2023 corresponding to the related PCT Patent Application No. PCT/US2023/012810.

(Continued)

*Primary Examiner* — Thien Nguyen
(74) *Attorney, Agent, or Firm* — DLA PIPER LLP US (57) ABSTRACT

Numerous examples are disclosed of an improved grouping and error correction system for non-volatile memory cells. In one example, a system comprises a memory array comprising non-volatile memory cells arranged into rows and columns, wherein a non-volatile memory cell of the memory array stores a first bit of a first data grouping and a second bit of a second data grouping, and wherein the first grouping is backed by a first ECC block and the second grouping is backed by a second ECC block.

22 Claims, 9 Drawing Sheets

(56) References Cited

U.S. PATENT DOCUMENTS

2022/0004447 A1* 1/2022 Hikichi ................ G06F 11/073
2022/0208294 A1   6/2022 Lee

OTHER PUBLICATIONS

PCT Search Report and Written Opinion mailed on Sep. 7, 2023 corresponding to the related PCT Patent Application No. PCT/US2023/012810.
Taiwanese Office Action mailed on Dec. 9, 2024 corresponding to the related Taiwanese Patent Application No. 112134188.

* cited by examiner

GROUPING AND ERROR CORRECTION FOR NON-VOLATILE MEMORY CELLS

PRIORITY CLAIM

This application claims priority from U.S. Provisional Patent Application No. 63/427,406, filed on Nov. 22, 2022, and titled, "Level Assignment and Error Correction for Multilevel Non-Volatile Memory Cells," which is incorporated by reference herein.

FIELD OF THE INVENTION

Numerous examples are disclosed of an improved level assignment and error correction system for multi-level non-volatile memory cells.

BACKGROUND OF THE INVENTION

Figure 1:
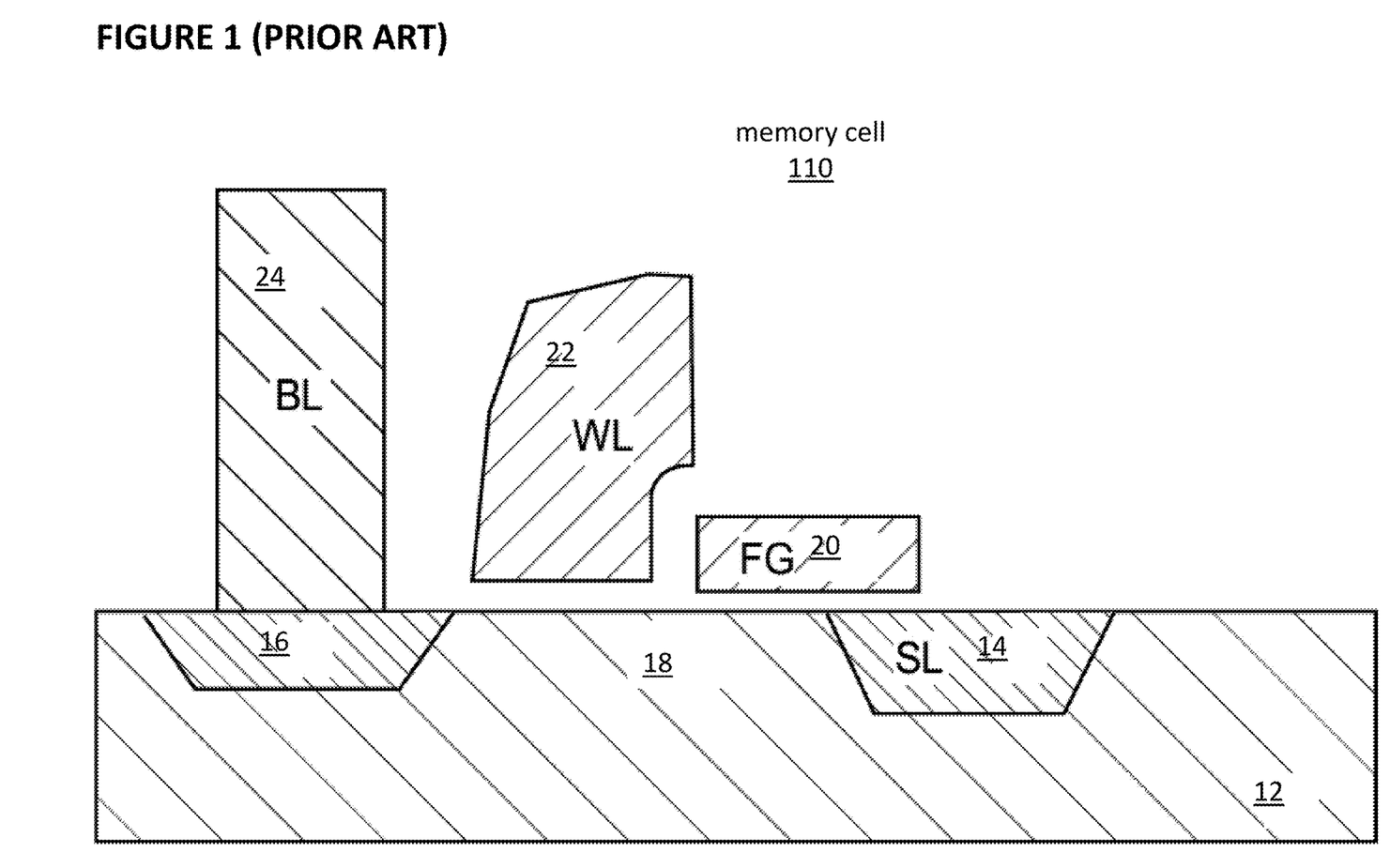
FIG. 1 depicts a prior art split-gate flash memory cell.

Non-volatile memories are well known. For example, U.S. Pat. No. 5,029,130 ("the '130 patent"), which is incorporated herein by reference, discloses an array of split-gate non-volatile memory cells, which are a type of flash memory cells. Such a memory cell 110 is shown in FIG. 1. Each memory cell 110 includes source region 14 and drain region 16 formed in semiconductor substrate 12, with channel region 18 there between. Floating gate 20 is formed over and insulated from (and controls the conductivity of) a first portion of the channel region 18, and over a portion of the source region 14. Word line terminal 22 (which is typically coupled to a word line) has a first portion that is disposed over and insulated from (and controls the conductivity of) a second portion of the channel region 18, and a second portion that extends up and over the floating gate 20. The floating gate 20 and word line terminal 22 are insulated from the substrate 12 by a gate oxide. Bitline 24 is coupled to drain region 16.

Memory cell 110 is erased (where electrons are removed from the floating gate) by placing a high positive voltage on the word line terminal 22, which causes electrons on the floating gate 20 to tunnel through the intermediate insulation from the floating gate 20 to the word line terminal 22 via Fowler-Nordheim (FN) tunneling.

Memory cell 110 is programmed by source side injection (SSI) with hot electrons (where electrons are placed on the floating gate) by placing a positive voltage on the word line terminal 22, and a positive voltage on the source region 14. Electron current will flow from the drain region 16 towards the source region 14. The electrons will accelerate and become heated when they reach the gap between the word line terminal 22 and the floating gate 20. Some of the heated electrons will be injected through the gate oxide onto the floating gate 20 due to the attractive electrostatic force from the floating gate 20.

Memory cell 110 is read by placing positive read voltages on the drain region 16 and word line terminal 22 (which turns on the portion of the channel region 18 under the word line terminal). If the floating gate 20 is positively charged (i.e., erased of electrons), then the portion of the channel region 18 under the floating gate 20 is turned on as well, and current will flow across the channel region 18, which is sensed as the erased or "1" state. If the floating gate 20 is negatively charged (i.e., programmed with electrons), then the portion of the channel region under the floating gate 20 is mostly or entirely turned off, and current will not flow (or there will be little flow) across the channel region 18, which is sensed as the programmed or "0" state.

Table No. 1 depicts typical voltage and current ranges that can be applied to the terminals of memory cell 110 for performing read, erase, and program operations:

TABLE No. 1

| Operation of Flash Memory Cell 110 of FIG. 1 | | | |
|---|---|---|---|
| | WL | BL | SL |
| Read | 2-3 V | 0.6-2 V | 0 V |
| Erase | ~11-13 V | 0 V | 0 V |
| Program | 1-2 V | 10.5-3 µA | 9-10 V |

Figure 2:
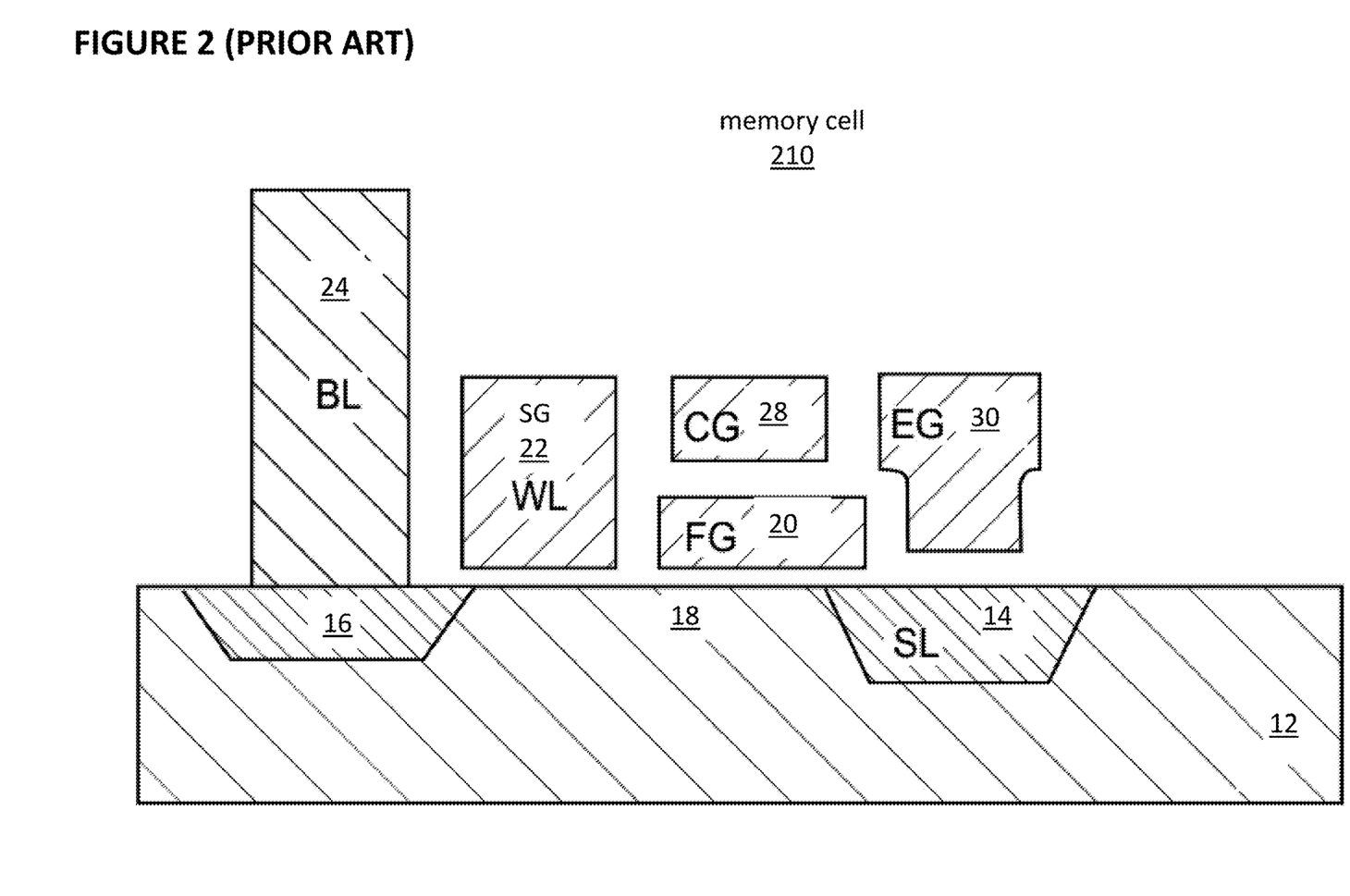
FIG. 2 depicts another prior art split-gate flash memory cell.

Other split-gate memory cell configurations, which are other types of flash memory cells, are known. For example, FIG. 2 depicts a four-gate memory cell 210 comprising source region 14, drain region 16, floating gate 20 over a first portion of channel region 18, a select gate 22 (typically coupled to a word line, WL) over a second portion of the channel region 18, a control gate 28 over the floating gate 20, and an erase gate 30 over the source region 14. This configuration is described in U.S. Pat. No. 6,747,310, which is incorporated herein by reference for all purposes. Here, all gates are non-floating gates except floating gate 20, meaning that they are electrically connected or connectable to a voltage source. Programming is performed by heated electrons from the channel region 18 injecting themselves onto the floating gate 20. Erasing is performed by electrons tunneling from the floating gate 20 to the erase gate 30.

Table No. 2 depicts typical voltage and current ranges that can be applied to the terminals of memory cell 210 for performing read, erase, and program operations:

TABLE No. 2

| Operation of Flash Memory Cell 210 of FIG. 2 | | | | |
|---|---|---|---|---|
| | WL/SG | BL | CG | EG | SL |
| Read | 1.0-2 V | 0.6-2 V | 0-2.6 V | 0-2.6 V | 0 V |
| Erase | −0.5 V/0 V | 0 V | 0 V/-8 V | 8-12 V | 0 V |
| Program | 1 V | 0.1-1 µA | 8-11 V | 4.5-9 V | 4.5-5 V |

Figure 3:
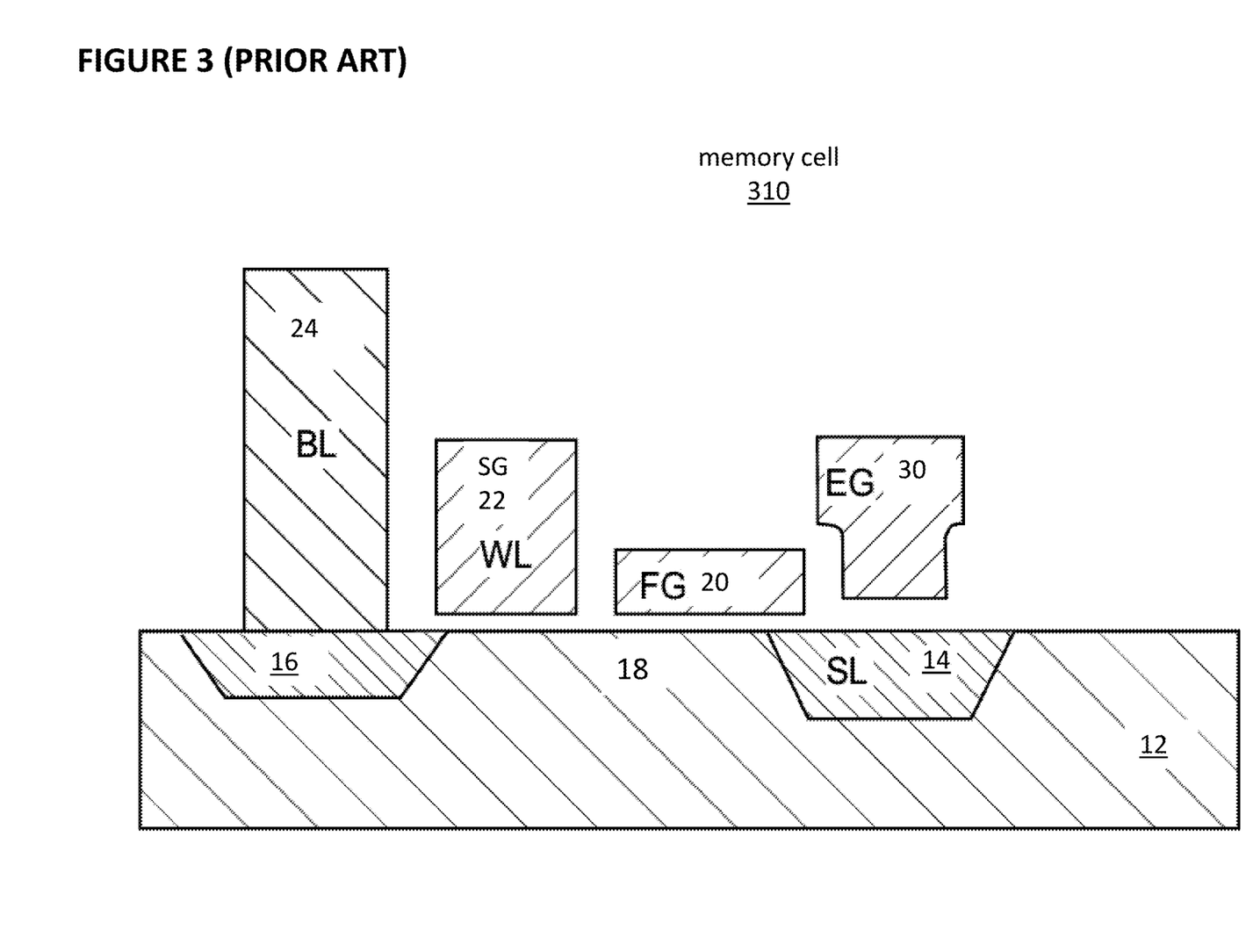
FIG. 3 depicts another prior art split-gate flash memory cell.

FIG. 3 depicts a three-gate memory cell 310, which is another type of flash memory cell. Memory cell 310 is identical to the memory cell 210 of FIG. 2 except that memory cell 310 does not have a separate control gate. The erase operation (whereby erasing occurs through use of the erase gate) and read operation are similar to that of the FIG. 2 except there is no control gate bias applied. The programming operation also is done without the control gate bias, and as a result, a higher voltage is applied on the source line during a program operation to compensate for a lack of control gate bias.

Table No. 3 depicts typical voltage and current ranges that can be applied to the terminals of memory cell 310 for performing read, erase, and program operations:

TABLE No. 3

| Operation of Flash Memory Cell 310 of FIG. 3 | | | |
|---|---|---|---|
| | WL/SG | BL | EG | SL |
| Read | 0.7-2.2 V | 0.6-2 V | 0-2.6 V | 0 V |
| Erase | −0.5 V/0 V | 0 V | 11.5 V | 0 V |
| Program | 1 V | 0.2-3 µA | 4.5 V | 7-9 V |

Figure 4:
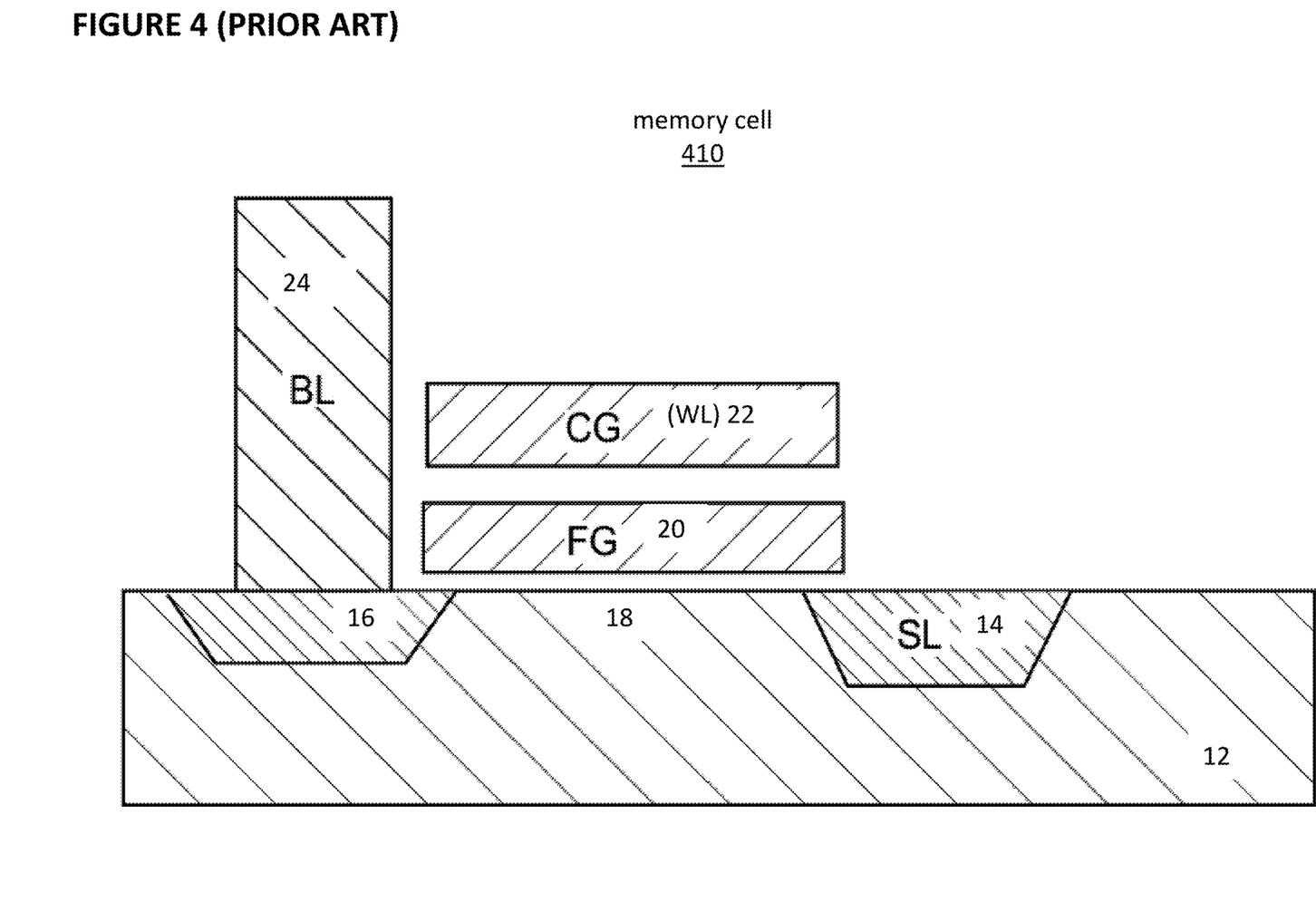
FIG. 4 depicts another prior art split-gate flash memory cell.

FIG. 4 depicts stacked-gate memory cell 410, which is another type of flash memory cell. Memory cell 410 is similar to memory cell 110 of FIG. 1, except that floating gate 20 extends over the entire channel region 18, and control gate 22 (which here will be coupled to a word line) extends over floating gate 20, separated by an insulating layer (not shown). The erase is done by FN tunneling of electrons from FG to substrate, programming is by channel hot electron (CHE) injection at region between the channel 18 and the drain region 16, by the electrons flowing from the source region 14 towards to drain region 16 and read operation which is similar to that for memory cell 210 with a higher control gate voltage.

Table No. 4 depicts typical voltage ranges that can be applied to the terminals of memory cell 410 and substrate 12 for performing read, erase, and program operations:

TABLE No. 4

Operation of Flash Memory Cell 410 of FIG. 4

|  | CG | BL | SL | Substrate |
|---|---|---|---|---|
| Read | 2-5 V | 0.6-2 V | 0 V | 0 V |
| Erase | −8 to −10 V/0 V | FLT | FLT | 8-10 V/15-20 V |
| Program | 8-12 V | 3-5 V | 0 V | 0 V |

The methods and means described herein may apply to other non-volatile memory technologies such as FINFET split-gate flash or stacked-gate flash memory, NAND flash, SONOS (silicon-oxide-nitride-oxide-silicon, charge trap in nitride), MONOS (metal-oxide-nitride-oxide-silicon, metal charge trap in nitride), ReRAM (resistive ram), PCM (phase change memory), MRAM (magnetic ram), FeRAM (ferroelectric ram), CT (charge trap) memory, CN (carbon-tube) memory, OTP (bi-level or multi-level one time programmable), and CeRAM (correlated electron ram), without limitation.

Figure 5:
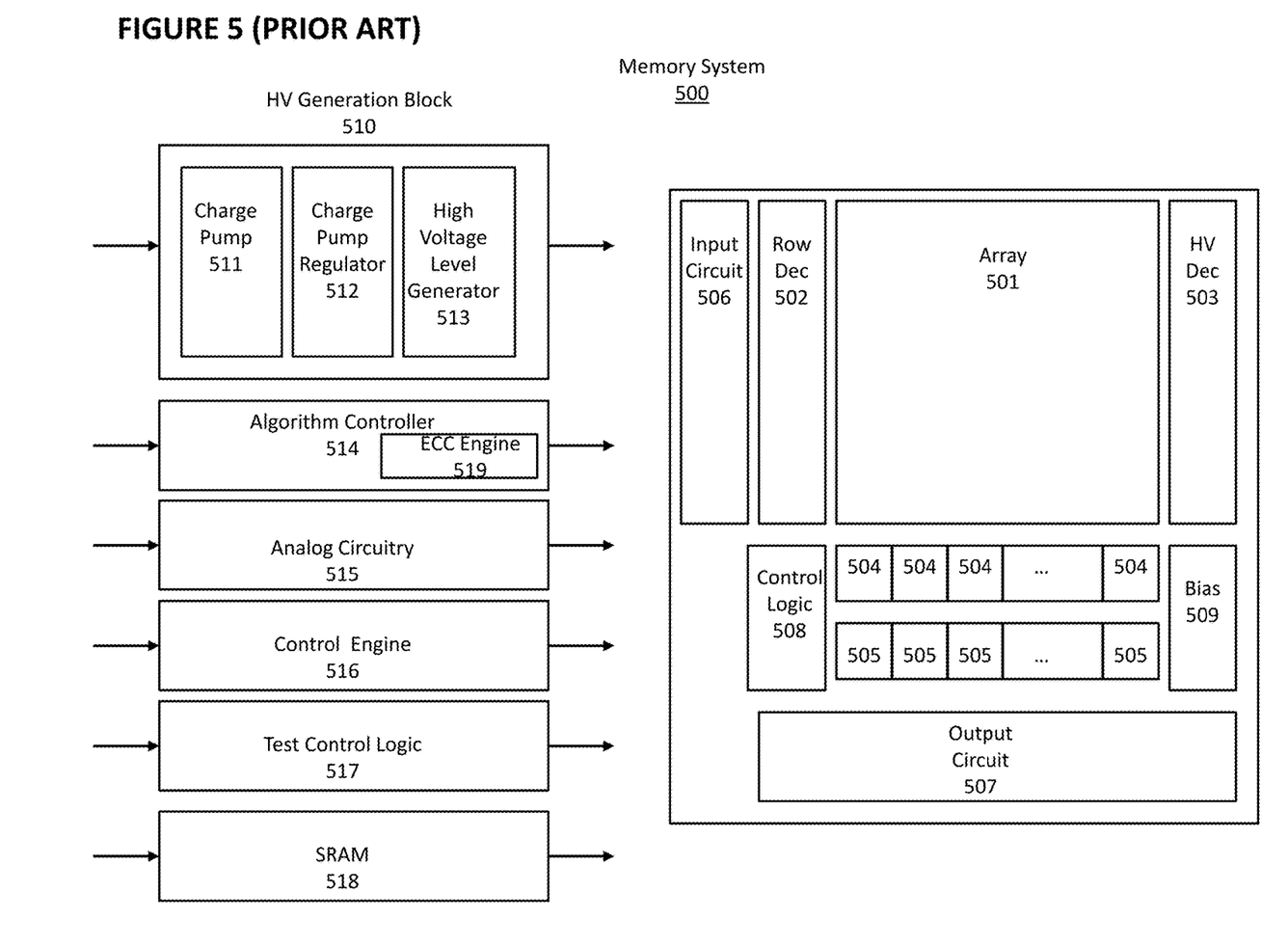
FIG. 5 depicts a prior art memory system.

FIG. 5 depicts a block diagram of prior art memory system 500 suitable for analog multi-level cell (MLC) memory storage (e.g., where the separation between levels is 1-2 variation sigmas and is less stringent than digital MLC memory storage) or vector-matrix-multiplication neural network applications (e.g., where the separation between levels is 1-2 variation sigmas and is less stringent than digital MLC memory storage).

Memory system 500 comprises array 501, row decoder 502, high voltage decoder 503, column decoders 504, bit line drivers 505, input circuit 506, output circuit 507, control logic 508, and bias generator 509. Memory system 500 further comprises high voltage generation block 510, which comprises charge pump 511, charge pump regulator 512, and high voltage level generator 513. Memory system 500 further comprises (program/erase, or weight tuning) algorithm controller 514, analog circuitry 515, control engine 516 (that may include special functions such as arithmetic functions, activation functions, embedded microcontroller logic, without limitation), test control logic 517, and SRAM block 518 to store intermediate data such as for input circuits (e.g., activation data) or output circuits (neuron output data) or data in for programming (such as data in for whole row or multiple rows).

Array 501 comprises rows and columns of non-volatile memory cells, such as memory cells 110, 210, 310, or 410 from FIGS. 1-4, respectively.

The input circuit 506 may include circuits such as a DAC (digital to analog converter), DPC (digital to pulses converter, digital to time modulated pulse converter), AAC (analog to analog converter, such as a current to voltage converter, logarithmic converter), PAC (pulse to analog level converter), or any other type of converters. The input circuit 506 may implement one or more of normalization, linear or non-linear up/down scaling functions, or arithmetic functions. The input circuit 506 may implement a temperature compensation function for input levels. The input circuit 506 may implement an activation function such as ReLU or sigmoid. Input circuit 506 may store digital activation data to be applied as or combined with an input signal during a program or read operation. The digital activation data can be stored in registers. Input circuit 506 may comprise circuits to drive the array terminals, such as CG, WL, EG, and SL lines, which may include sample-and-hold circuits and buffers. A DAC can be used to convert digital activation data into an analog input voltage to be applied to the array.

The output circuit 507 may include circuits such as an ITV (current-to-voltage circuit), ADC (analog to digital converter, to convert neuron analog output to digital bits), AAC (analog to analog converter, such as a current to voltage converter, logarithmic converter), APC (analog to pulse(s) converter, analog to time modulated pulse converter), or any other type of converters. The output circuit 507 may convert array outputs into activation data. The output circuit 507 may implement an activation function such as rectified linear activation function (ReLU) or sigmoid. The output circuit 507 may implement one or more of statistic normalization, regularization, up/down scaling/gain functions, statistical rounding, or arithmetic functions (e.g., add, subtract, divide, multiply, shift, log) for neuron outputs. The output circuit 507 may implement a temperature compensation function for neuron outputs or array outputs (such as bitline output) so as to keep power consumption of the array approximately constant over temperature or to improve precision of the array (neuron) outputs such as by keeping the IV slope approximately the same over temperature. The output circuit 507 may comprise registers for storing output data. The output circuit 507 may include error correction logic to fix error from the neuron outputs. The error correction is such as Hamming code that can do single error correction and double error detection (SECDED). The error is such as from noise, data retention, disturb etc.

For digital MLC memory storage (e.g., where the level separation is typically 12 sigmas, and can be 4-6 sigmas), the input circuit 506 does not need to include analog circuits such as a D/A converter, scaling, activation function, or arithmetic circuits and the output circuit 507 does not need to include analog circuits such as an A/D (analog to digital) converter, scaling, activation function, or arithmetic circuits. However, the output circuit 507 may need a multi-level sensing amplifier circuit that translates the analog output from the selected memory cell (cell current) into digital output bits. For example, the output of a 4 level cell may be represented by 2 digital output bits, and the output of a 16 level cell may be represented by 4 digital output bits.

Algorithm controller 514 comprises ECC (error correction code) engine 519, which can generate ECC data as described below.

Figure 6:
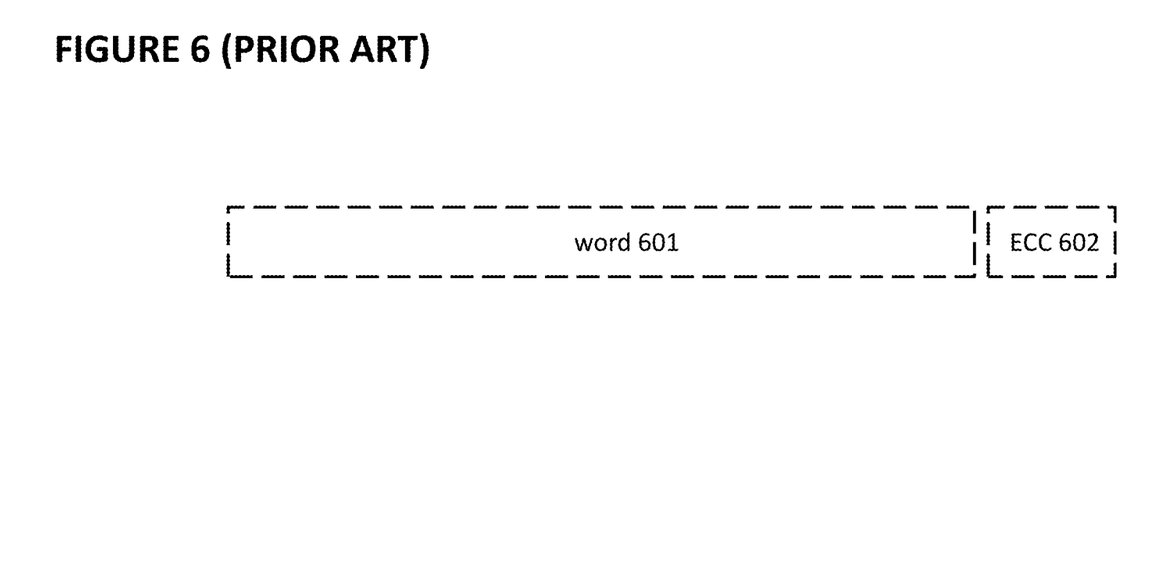
FIG. 6 depicts a prior art word of data and associated ECC data.

With reference to FIG. 6, it is common in the prior art to store data in words, such as word 601, within array 501 in analog multi-level memory cells (in which each memory cell can store two or more levels using a range of analog voltages or currents to represent each level) or as digital multi-level memory cells (in which each memory cell can store two or more levels using a discrete level of voltage or current to represent each level). An array includes a plurality of rows and a plurality of columns. A word can, for example, comprise 128 bits. For a single level cell, 128 bits requires 128 cells to store the information. A row may consist of multiple words. For example, a row of 4096 cells may comprise 32 words of 128 bits per word. To select a 128-bit word, a row is selected and 128 columns out of 4096 columns are selected.

FIG. 6 depicts a single exemplary word 601, which in this example comprises a certain number of non-volatile memory cells in array 501. The prior art also includes various error detection and error correction schemes that can be implemented by ECC engine 519.

When memory system 500 follows a NOR memory structure, one error correction scheme that can be applied is one that utilizes Hamming codes, where for each group of bits (such as word 601) a set of error correction data (such as ECC 602) is generated and stored along with the group of bits. For example, ECC 602 can be generated by performing a Hamming function on word 601. In this manner, each bit in word 601 is backed by ECC 602. During a read operation, memory system 500 reads word 601 and ECC 602. ECC 602 will indicate if an error is contained in word 601 as it was read, and ECC 602 can be used to correct up to one single bit error (e.g., a "1" that has mistakenly been read as a "0," or a "0" that has mistakenly been read as a "1"). ECC 602 has limitations. Specifically, in this example, ECC 602 can only be used to correct a single bit error. If two or more bit errors occur, ECC 602 will be unable to correct the errors.

In the situation where memory system 500 is used for neural network vector matrix multiplication, the error correction can be done on the digital output bits from the output circuit 507 such as from ADC outputs. In this case, multiple words in multiple rows can be selected instead of single words. Also, in this case multiple cells in multiple rows in a single column can be selected instead of a single cell in a single row in a single column.

An example of a single-bit error and multiple-bit errors can be illustrated with reference to Table No. 5:

TABLE No. 5

Multi-level Cell Assignment

| Cell current | DIN0 | DIN1 |
|---|---|---|
| 1 µA | 0 | 0 |
| 2 µA | 0 | 1 |
| 3 µA | 1 | 0 |
| 4 µA | 1 | 1 |

In the example of Table No. 5, each cell can store two bits of data, DINO0 and DIN1, meaning it can store four analog levels of data. A value of 00 corresponds to 1 µA of read current, 01 corresponds to 2 µA, 10 corresponds to 3 µA, and 11 corresponds to 4 µA. If a cell is intended to store a 00 value, but the sensed current is mistakenly detected as 2 µA instead of 1 µA (a single level error), then the data will be interpreted as 01 instead of 00, which contains a single bit error. With no other errors present, ECC 601 can be used to correct 01 to 00. However, if a cell is intended to store a 00 value, but the sensed current is mistakenly detected as 4 µA instead of 1 µA (a multi-level error, e.g., >2 levels), then the data will be interpreted as 11 instead of 00, which contains two bit errors. ECC 601 will be unable to correct this data.

An improved error correction scheme is required for multi-level memory cells that is able to correct more than a single bit error or more than 2 level errors.

SUMMARY OF THE INVENTION

Numerous examples are disclosed of an improved level assignment and error correction system for multi-level non-volatile memory cells.

DETAILED DESCRIPTION OF THE INVENTION

Figure 7A:
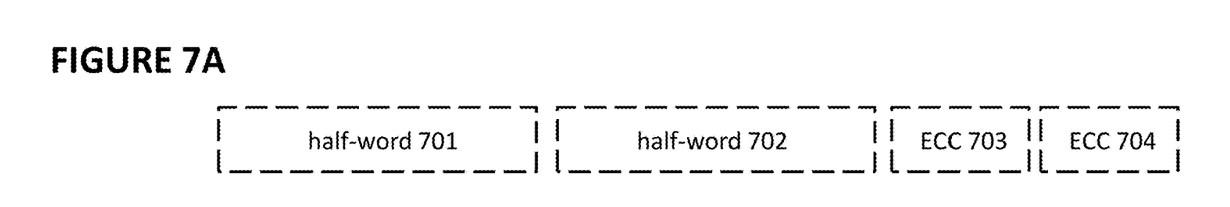
FIGS. 7A, 7B, and 7C depict an improved error correction system.
Figure 7B:
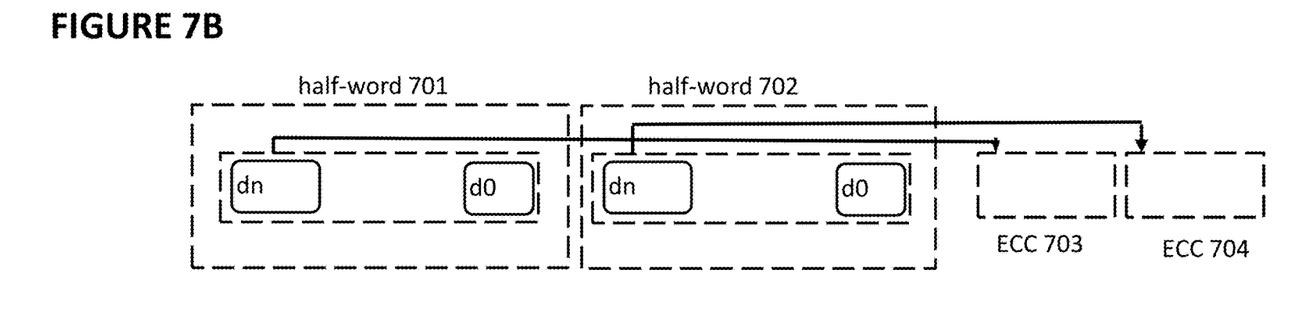
Figure 7C:
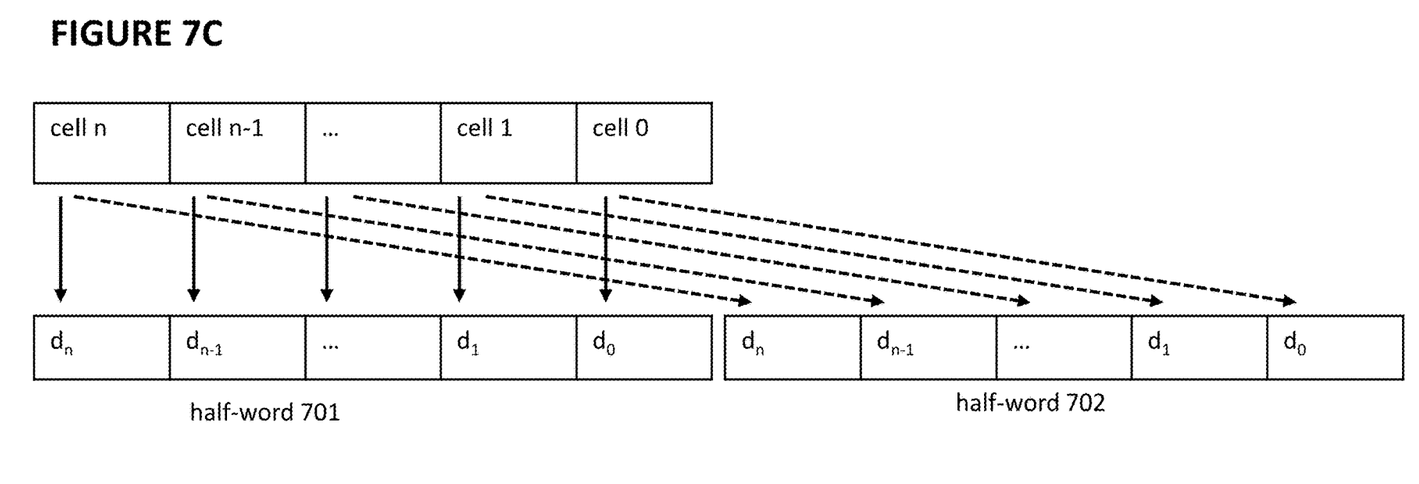

FIGS. 7A, 7B, and 7C depict an improved error correction scheme for a multi-level non-volatile memory cell.

In FIGS. 7A and 7B, data to be stored in array 501 is divided into sub-words, such as half-words, instead of whole words, and two ECC blocks are generated and stored instead of one ECC block. This example depicts half-word 701, half-word 702, ECC block 703 associated with half-word 701, and ECC block 704 associated with half-word 702.

FIG. 7C depicts cell level assignment detail for the system of FIGS. 7A and 7B. Here, the word comprises n cells, referred to as cell n to cell 0. As an example, a physical cell can store 2 digital bits. One bit of a half-word in cell n is backed by an ECC code in ECC 703, and one bit in another half-word in cell n is backed by an ECC code in ECC 704. One physical cell contains one bit for half-word 701 and the other bit for half-word 702. For example, cell n contains $d_n$ of half-word 701 and $d_n$ of half-word 702. If a cell is intended to store a 00 value but the sensed current is mistakenly detected as 4 µA instead of 1 µA, then the data will be interpreted as 11 instead of 00, which contains two bit errors. ECC 703 will be used to correct the error of the first bit, and ECC 704 will be used to correct the error of the second bit, with the end result that the mistaken value of 11 will be corrected back to the intended 00 value. This is a significant improvement over the prior art.

The physical cell storing ECC bits can be combined in the same way with one physical cell storing one bit for ECC 703 and another bit for ECC 704 for a 2-bit cell example (where one cell can store 4 levels).

The example of FIGS. 7A-7C describes multi-level cells that can store two bits representing four different levels. A person of ordinary skill in the art will appreciate that the same principles can apply for multi-level cells storing more than two bits by using additional ECC blocks.

Alternatively, words can be divided into more than two sub-words, for example four sub-words with ECC implemented for each sub-word. One physical cell would contain bits for all the sub-words.

Alternatively, multiple words can be combined into a super-word, which is a structure containing two or more words with ECC implemented for each word. One physical cell would contain bits for the two or more words.

Figure 8:
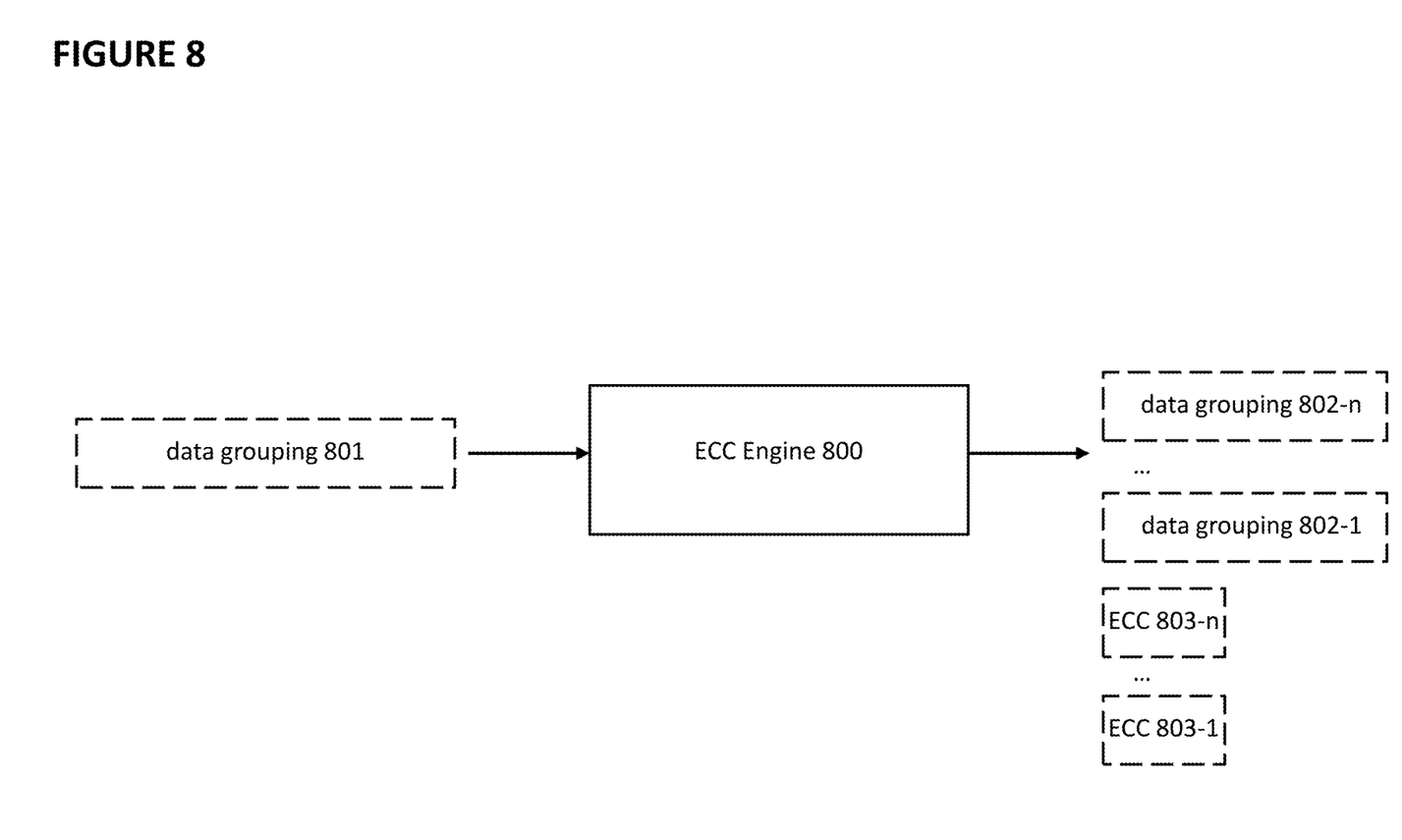
FIG. 8 depicts an ECC engine for implementing an improved error correction system.

These concepts are shown in FIG. 8. In FIG. 8, the system stores the data represented by data grouping 801. Data grouping 801 is a collection of bits and can be a word, a super-word, sub-words, or any other grouping of data. Data grouping 801 is provided to ECC engine 800 (which is an example of ECC engine 519 implementing the ECC algorithms described herein), and ECC engine 800 separates data grouping 801 into data groupings 802-*n*, . . . , 802-1. For example, if n=2, two data groupings, 802-2 and 802-1, are generated. If n=3, three data groupings, 802-3, 803-3, and 803-1 are generated. If n=4, four data groupings, 802-4, 803-3, 803-2, and 803-1 are generated. In one example, n also equals the number of bits stored in each memory cell. ECC engine 800 also generates ECC blocks 803-*n*, . . . , 803-1, where respective bits stored in a memory cell are backed by one of ECC blocks 803-*n*, . . . , 803-1, such that the entirety of the respective memory cell is backed collectively by ECC blocks 803-*n*, . . . , 803-1, with respective ones of the ECC blocks backing one bit of a respective memory cell.

For example, if data grouping 801 is a word and n=4, four quarter-word groupings (which are sub-word groupings) will be generated: data grouping 802-4 (a first quarter-word or first sub-word), 802-3 (a second quarter-word or second sub-word), 802-2 (a third quarter-word or third sub-word), and 802-1 (a fourth quarter-word or fourth sub-word), with a memory cell stores a bit from respective data groupings 802-4, 802-3, 802-2, and 802-1. ECC engine 800 will also generate ECC blocks 803-4, 803-3, 803-2, and 803-1, where respective bits stored in a memory cell are backed by one of ECC blocks 803-4, 803-3, 803-2, and 803-1, such that the entirety of the respective memory cell is backed collectively by ECC blocks 803-4, 803-3, 803-2, and 803-1, with respective ones of the ECC blocks backing one bit of a respective memory cell.

Figure 9:
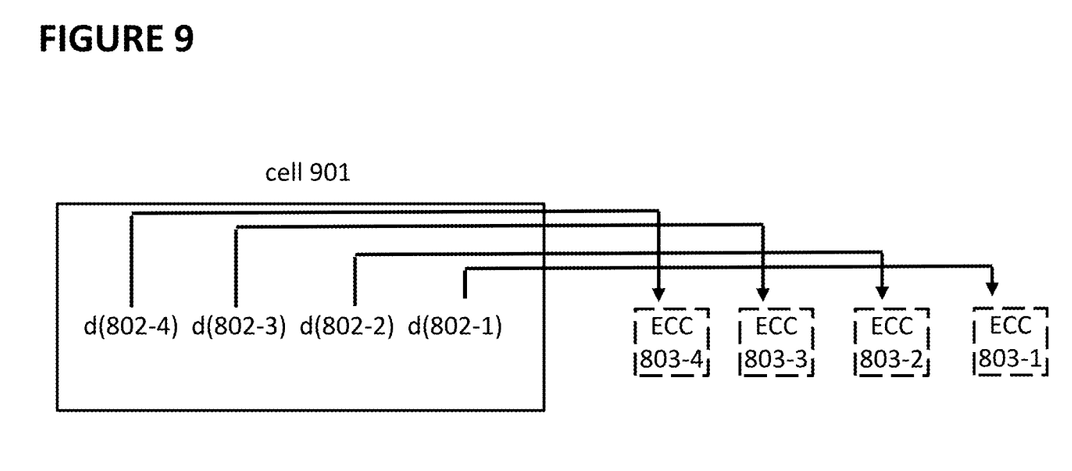
FIG. 9 depicts an example using the ECC engine of FIG. 8.

FIG. 9 illustrates this example, where memory cell 901 stores a bit from data grouping 802-4 (labeled d(802-4)), a bit from data grouping 802-3 (labeled d(802-3)), a bit from data grouping 802-2 (labeled d(802-2)), and a bit from data grouping 802-1 (labeled d(802-1)), backed by ECC blocks 803-4, 803-3, 803-3, and 803-1, respectively. Under this scheme, up to four bit errors in cell 901 (i.e., a first error, a second error, a third error, and a fourth error) can be corrected by ECC blocks 803-4, 803-3, 803-3, and 803-1.

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements therebetween, as well as forming the element indirectly on the substrate with one or more intermediate materials/elements there between.

What is claimed is:

1. A system comprising:
a memory array comprising non-volatile memory cells arranged into rows and columns, wherein a non-volatile memory cell of the memory array stores a first bit and a second bit, the first bit selected from a first data grouping and the second bit selected from a second data grouping, and wherein the first bit is backed by a first ECC block and the second bit is backed by a second ECC block.

2. The system of claim 1, wherein the first data grouping is a first half-word and the second data grouping is a second half-word, the first half-word and the second half-word forming a word.

3. The system of claim 1, wherein the first data grouping is a first word and the second data grouping is a second word, the first word and the second word forming a super-word.

4. The system of claim 1, wherein the first ECC block can correct a first single bit error in the non-volatile memory cell and the second ECC block can correct a second single bit error in the non-volatile memory cell.

5. The system of claim 1, wherein respective non-volatile memory cells of the memory array further store a third bit of a third data grouping backed by a third ECC block and a fourth bit of a fourth data grouping backed by a fourth ECC block.

6. The system of claim 5, wherein the first grouping is a first quarter-word, the second grouping is a second quarter-word, the third grouping is a third quarter-word, and the fourth grouping is a fourth quarter-word, the first quarter-word, the second quarter-word, the third quarter-word, and the fourth quarter-word forming a word.

7. The system of claim 1, wherein the non-volatile memory cell is a digital multi-level memory cell.

8. The system of claim 1, wherein the non-volatile memory cell is an analog multi-level memory cell.

9. The system of claim 1, wherein the memory array is a vector-by-matrix multiplication array in a neural network.

10. The system of claim 1, wherein the non-volatile memory cell is a split- gate flash memory cell.

11. The system of claim 1, wherein the non-volatile memory cell is a stacked-gate flash memory cell.

12. A method comprising:
selecting a bit from a first data grouping;
selecting a bit from a second data grouping;
storing the bit from the first data grouping in a non-volatile memory cell in an array;
storing the bit from the second data grouping in the non-volatile memory cell;
storing ECC data for the bit from the first data grouping in a first ECC block in the array; and
storing ECC data for the bit from the second data grouping in a second ECC block in the array.

13. The method of claim 12, wherein the first data grouping is a first half-word and the second data grouping is a second half-word, the first half-word and the second half-word forming a word.

14. The method of claim 12, wherein the first data grouping is a first word and the second data grouping is a second word, the first word and the second word forming a super-word.

15. The method of claim 12, wherein the first ECC block can correct a first single bit error in the non-volatile memory cell and the second ECC block can correct a second single bit error in the non-volatile memory cell.

16. The method of claim 12 comprising:
    storing a bit from a third data grouping in the non-volatile memory cell;
    storing a bit from a fourth data grouping in the non-volatile memory cell;
    storing ECC data for the bit from the third data grouping in a third ECC block in the array; and
    storing ECC data for the bit from the fourth data grouping in a fourth ECC block in the array.

17. The method of claim 16, wherein the first data grouping is a first quarter-word, the second data grouping is a second quarter-word, the third data grouping is a third quarter-word, and the fourth data grouping is a fourth quarter-word, the first quarter-word, the second quarter-word, the third quarter-word, and the fourth quarter-word forming a word.

18. The method of claim 12, wherein the non-volatile memory cell is a digital multi-level memory cell.

19. The method of claim 12, wherein the non-volatile memory cell is an analog multi-level memory cell.

20. The method of claim 12, wherein the array is a vector-by-matrix multiplication array in a neural network.

21. The method of claim 12, wherein the non-volatile memory cell is a split-gate flash memory cell.

22. The method of claim 12, wherein the non-volatile memory cell is a stacked-gate flash memory cell.

* * * * *